(No Model.)

J. F. KELLOGG.
POLE TIP.

No. 444,442. Patented Jan. 13, 1891.

Witnesses
Horace G. Seitz
R. W. Dayton

Inventor
J. F. Kellogg
By his Attorneys,
C. A. Snow & Co.

THE NORRIS PETERS CO., PHOTO-LITHO., WASHINGTON, D. C.

UNITED STATES PATENT OFFICE.

JAMES FRANKLIN KELLOGG, OF MITCHELL, SOUTH DAKOTA.

POLE-TIP.

SPECIFICATION forming part of Letters Patent No. 444,442, dated January 13, 1891.

Application filed June 6, 1890. Serial No. 354,538. (No model.)

To all whom it may concern:

Be it known that I, JAMES FRANKLIN KELLOGG, a citizen of the United States, residing at Mitchell, in the county of Davison and State of South Dakota, have invented a new and useful Pole-Tip, of which the following is a specification.

My invention relates to an attachment for vehicle-pole tips and neck-yokes, and has for its object to provide a strong and simple attachment capable of firmly supporting the pole, holding it up from the ground and off from the horses' necks, and by its construction obviating the possibility of accident caused by the dropping down of the pole on the ground when the tugs or whiffletrees become detached while it is in motion, and to allow perfect freedom of motion for the neck-yoke; and it consists of certain novel combinations and arrangement of parts hereinafter more fully described, illustrated in the accompanying drawings, and pointed out in the appended claims.

Figure 1:
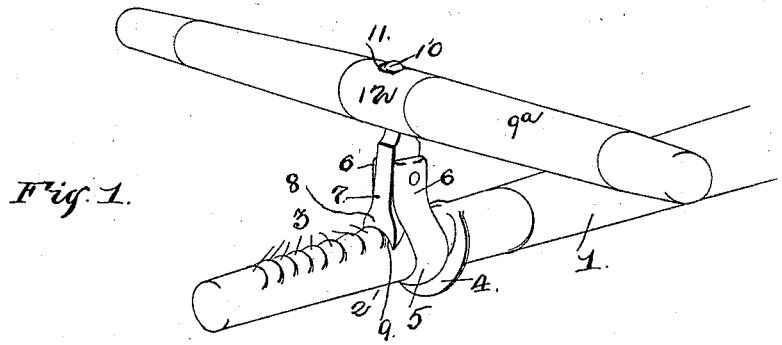
Figure 3:
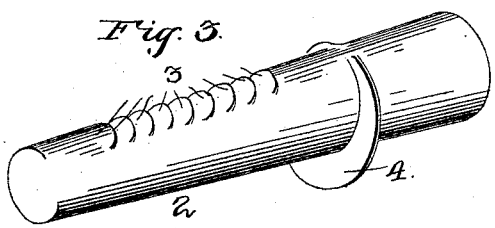
Figure 4:
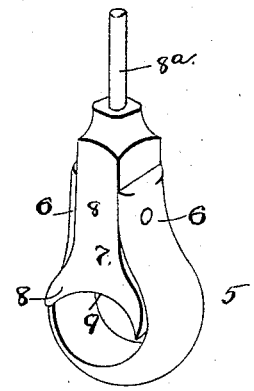
Figure 2:
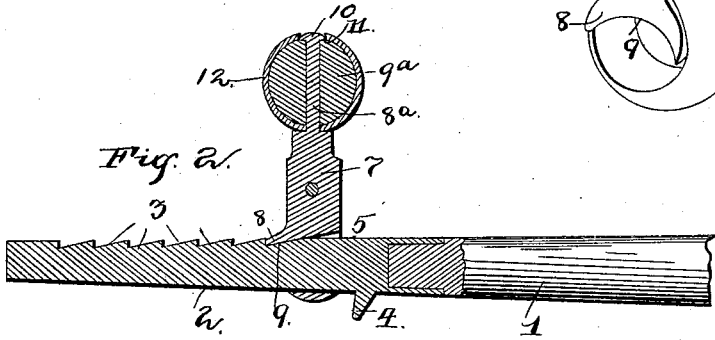

In the accompanying drawings, Figure 1 is a perspective view of a vehicle-pole provided with my invention. Fig. 2 is a longitudinal section of the same. Fig. 3 is a detail in perspective of the notched pole-tip. Fig. 4 is a similar view of the ring-and-dog attachment with the neck-yoke detached.

Like figures of reference indicate like parts in the drawings.

1 represents a wagon-pole having at its outer end a metallic pole-tip 2, provided with a series of notches 3 on its upper surface and having the usual annular stop 4. A ring 5 encircles the pole-tip and works thereon between the end thereof and said annular stop 4, which is the ordinary holdback for the pole, preventing the encircling ring from sliding back thereon. Between the arms 6 of ring 5 a dog 7 is pivoted, and is adapted to enter into engagement with the notches 3 on the pole-tip 2, being provided at the end engaging with said notches with a concave edge 8, beveled, as at 9, to conform to the curvature of the pole-tip and to insure both a ready and certain engagement with the notches 3 of said pole-tip. Above its pivotal point dog 7 is further provided with an integral shank portion $8^a$, that is adapted to pass through a neck-yoke $9^a$, swiveling the same thereon, and terminates on the upper face of said neck-yoke in a swaged head 10, which is spread down into a seat 11 of the metallic band 12, encircling the said neck-yoke. Neck-yoke $9^a$ is constructed in the usual manner, and is provided at each end with the customary loops for attaching to the harness of the animals, and in view of being swiveled to said dog 7 prevents the tongue from being drawn sidewise upon the animals at every back and forward motion of the same.

In operation the dog 7 is so attached to the ring working on the pole-tip and the neck-yoke that the weight of the vehicle-tongue produces sufficient leverage to force the dog in tight engagement with the notches on the pole-tip, and also by such engagement preventing any of the rattling that is customary on the ordinary pole attachments, and any forward pressure which is exerted on the neck-yoke only forces the dog still tighter in the notches, and thus provides a permanent engagement between the pole-tip and dog attachment, and for the permanent support of the pole while the vehicle is either stationary or in motion.

Having described my invention, what I claim, and desire to secure by Letters Patent, is—

1. In a pole attachment, the combination of a pole-tip provided with a series of notches on its upper face, the neck-yoke ring encircling the pole-tip and having a pivoted dog adapted to enter into engagement with the notches on the said pole-tip, and a neck-yoke swiveled on the dog, substantially as specified.

2. In a wagon-pole attachment, the combination of a pole-tip provided with a series of notches on its upper face, the neck-yoke ring encircling the pole-tip and having a pivoted dog provided at its lower end with a concave beveled edge conforming to the curvature of the pole-tip and adapted to engage with the notches in said pole-tip, said dog being also provided at its upper end with an integral shank-extension, and a neck-yoke swiveled on said shank, substantially as described.

3. In a pole attachment, the combination of a pole-tip provided with a series of notches on its upper face, the neck-yoke ring encircling the pole-tip and having a pivoted dog adapted to enter into engagement with the notches on the said pole-tip, substantially as specified.

In testimony that I claim the foregoing as my own I have hereto affixed my signature in presence of two witnesses.

JAMES FRANKLIN KELLOGG.

Witnesses:
GEO. H. RATHMAN,
H. E. MOSES.